United States Patent
Pope et al.

(10) Patent No.: US 9,075,777 B1
(45) Date of Patent: Jul. 7, 2015

(54) SYSTEM AND METHOD FOR DYNAMICALLY CHANGING WEB UNIFORM RESOURCE LOCATORS

(75) Inventors: Elmore Eugene Pope, Sammamish, WA (US); Christopher L. Scofield, Seattle, WA (US); Brad E. Marshall, Bainbridge Island, WA (US); Eric B. Merritt, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1911 days.

(21) Appl. No.: 12/038,479

(22) Filed: Feb. 27, 2008

(51) Int. Cl.
*G06F 17/22* (2006.01)

(52) U.S. Cl.
CPC .................................. *G06F 17/2235* (2013.01)

(58) Field of Classification Search
CPC ............ G06F 17/3089; G06F 17/2235; G06F 17/30887
USPC .................................. 715/234, 243, 254, 255
See application file for complete search history.

(56) References Cited

U.S. PATENT DOCUMENTS

| | | | |
|---|---|---|---|
| 5,761,683 A | 6/1998 | Logan et al. | |
| 5,802,299 A * | 9/1998 | Logan et al. | ................... 709/218 |
| 5,835,718 A * | 11/1998 | Blewett | .......................... 709/218 |
| 6,687,877 B1 | 2/2004 | Sastry et al. | |
| 6,687,878 B1 | 2/2004 | Eintracht et al. | |
| 6,871,318 B1 | 3/2005 | Wynblatt et al. | |
| 2001/0011285 A1 * | 8/2001 | Kanno et al. | ................... 707/512 |
| 2002/0085025 A1 * | 7/2002 | Busis et al. | ..................... 345/738 |
| 2002/0107986 A1 * | 8/2002 | Pfohe et al. | .................... 709/246 |
| 2003/0158953 A1 * | 8/2003 | Lal | ................. 709/230 |
| 2004/0177097 A1 * | 9/2004 | Yu et al. | ..................... 707/104.1 |
| 2006/0085735 A1 | 4/2006 | Shimizu | |
| 2007/0047780 A1 | 3/2007 | Hull et al. | |
| 2007/0061703 A1 | 3/2007 | Kambhatla et al. | |
| 2007/0067714 A1 | 3/2007 | Lin et al. | |
| 2007/0174762 A1 | 7/2007 | Plant | |
| 2007/0239797 A1 * | 10/2007 | Cattell et al. | ................... 707/201 |
| 2008/0065701 A1 * | 3/2008 | Lindstrom et al. | ............ 707/201 |
| 2008/0155398 A1 * | 6/2008 | Bodin et al. | ................... 715/257 |
| 2008/0209514 A1 * | 8/2008 | L'Heureux et al. | ............... 726/3 |
| 2008/0320498 A1 * | 12/2008 | Maykov et al. | ............... 719/320 |
| 2009/0077110 A1 * | 3/2009 | Petri | ............................ 707/102 |

* cited by examiner

*Primary Examiner* — Kyle Stork
(74) *Attorney, Agent, or Firm* — Robert C. Kowert; Meyertons, Hood, Kivlin, Kowert & Goetzel, P.C.

(57) ABSTRACT

A web browser is implemented to receive a document from a server. The document may include one or more embedded Uniform Resource Locator (URL) references. The web browser may display the document on a user interface. A user associated with the web browser may determine one or more of the original embedded URL references should be replaced. In response to user input, the web browser may change at least one of the original embedded URL references to a corresponding replacement embedded URL reference and display the document with the replacement embedded URL reference. The web browser may save an association of the original embedded URL reference with the replacement embedded URL reference and subsequently, when receiving the document with the original embedded URL reference, automatically replace the original embedded URL reference with the corresponding replacement embedded URL reference before displaying the document.

60 Claims, 8 Drawing Sheets

```
<html>
<body>                    335

Click <a href="http://www.foo1.com/">here</a>for more details about the product.

</body>
</html>
```

```
<html>
<body>                    337

Click <a href="http://www.foo2.com/">here</a>for more details about the product.

</body>
</html>
```

| File Name | Original URL | Replacement URL | Request Date/Time |
|---|---|---|---|
| index.htm | http://www.foo1.htm | http://www.foo2.htm | 01/01/2008 |
| index.htm | http://www.foo1.htm | http://www.foo3.htm | 01/02/2008 |

SYSTEM AND METHOD FOR DYNAMICALLY CHANGING WEB UNIFORM RESOURCE LOCATORS

BACKGROUND

The World Wide Web provides a system of interlinked hypertext documents (e.g., web pages) accessed via the Internet. Users typically use a web browser application to retrieve and display the documents, which may contain text, images, video and other multimedia content. Frequently, documents contain links (e.g., hyperlinks) that when selected by a user, cause the web browser to retrieve and display other documents.

Viewing a web page typically begins when a user types the Uniform Resource Locator (URL) of a web page into the web browser or when the user follows a hyperlink to the web page or resource. The web browser initiates a series of communications messages (e.g., transparent to the user) that cause the web browser to fetch and display the web page. The servername of the URL is resolved into an IP address using a global, distributed Internet database known as the domain name system, or DNS. The IP address is necessary to contact and send data packets to a web server. The browser requests the resource by sending a Hypertext Transfer Protocol (HTTP) request to the web server located at the IP address. Typically, a web page (e.g., made up of Hypertext Markup Language (HTML) text) is requested and parsed by the web browser, which may make additional requests for images and other files. The HTML tells the web browser how to render the text and images on the screen.

Many web pages will themselves contain hyperlinks to other related pages, downloads, source documents and other web resources. Frequently, the links will point to content controlled by other web sites. Many times, web site administrators will change or update their web content, resulting in hyperlinks in other documents that may point to content that no longer exists. A hyperlink that points to content that does not exist may be known as a "Broken Link" or "Dead Link" and when a user selects these hyperlinks, they may receive a "Page Not Found" error from their web browser.

Figure 1:
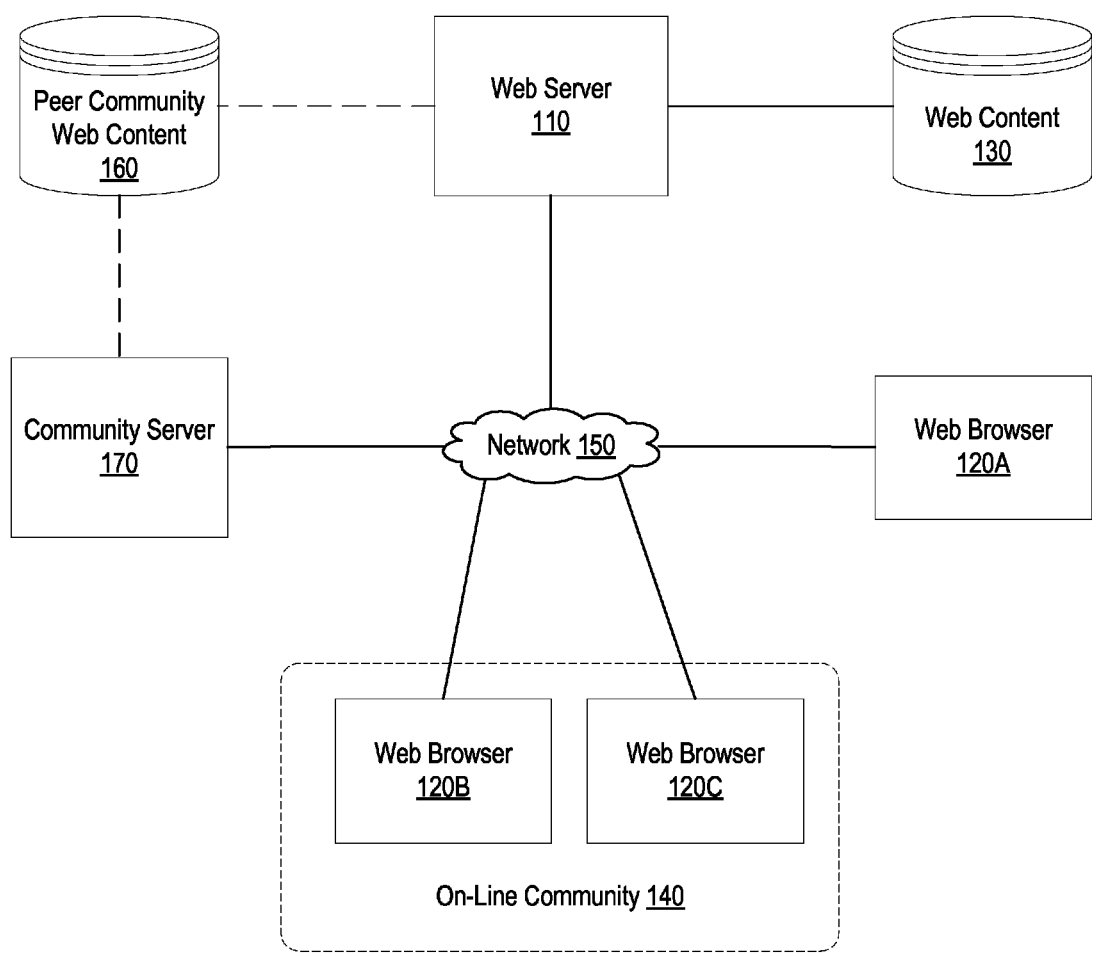
FIG. 1 is a block diagram illustrating a system for dynamically changing URLs, according to some embodiments.

While the system is described herein by way of example for several embodiments and illustrative drawings, those skilled in the art will recognize that the system is not limited to the embodiments or drawings described. It should be understood, that the drawings and detailed description thereto are not intended to limit the system to the particular form disclosed but on the contrary, the intention is to cover all modifications, equivalents and alternatives falling within the spirit and scope of the present system as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words, "include", "including", and "includes" mean including, but not limiting to.

DETAILED DESCRIPTION OF EMBODIMENTS

Introduction

Various embodiments of methods and systems configured to allow users of web-based content to dynamically change web URLs included within such content are explored in the following discussion. For example, a web browser may receive a document with one or more embedded URL references from a server. The web browser may display the document on a user interface. The user associated with the web browser may determine that one or more embedded URL references are incorrect. For example, the user may click on a link (e.g., implemented as an HTML "href" tag) to another web page and the web browser may respond by displaying a "Page Not Found" error, indicating a "Broken Link" or a "Dead Link". In other cases the user may determine the existing link is wrong (e.g., the link may refer to a valid page that differs from the one indicated or suggested by the link) or sub-optimal (e.g., there may exist a better source for information than the page referred to).

The user may find the correct link and interact with the web browser, causing the web browser to change one or more of the original embedded URL references to a corresponding one or more replacement URL references in the document source. In some embodiments, the change may take place locally (e.g., on the user's system, as opposed to on the server system from which the document was obtained). The web browser may then display the document with the replacement embedded URL references.

The web browser may save an association of one or more original embedded URL references to a corresponding one or more replacement embedded URL references. For example, the association of references may be stored in the web browser's cache or on a storage device. Subsequently (e.g., in another session, another day or another week) the web browser may receive the document, lookup the previously stored association, and replace at least one or more original embedded URL references with the corresponding replacement embedded URL references before displaying the document on the user interface. Thus, the user's replacement URLs may be persistent with respect to subsequent interaction with the document.

The user of the web browser may not have permission to change the document on the web server where the document was retrieved. In some embodiments, the web browser may send a request to a web server, where the request is to change the original embedded URL reference to the replacement embedded URL reference.

The web server may receive the request to change one or more original embedded URL references in a document to a corresponding one or more replacement URL references. In response to determining the change request is valid, the web server may change the one or more original embedded URL references to the corresponding one or more replacement embedded URL references in the document and store the document with the changes. Subsequently, when the document is requested, the server may send the document with the replacement embedded URL references.

In the following discussion, a general overview of a system for retrieving and displaying web documents is first provided, followed by a general overview of online user communities that may be employed in conjunction with the document system. Various techniques for implementing dynamic changing of URLs within such a system are then discussed. Finally, an exemplary embodiment of a computer system that may be configured to implement various aspects of the disclosed techniques is described.

Overview of Browser System and Web Documents

FIG. 1 is a block diagram illustrating a system for dynamically changing URLs, according to some embodiments. As noted above, a web browser 120 may be configured to retrieve a document on behalf of a user from web server 110 via network 150. Web server 110 may fetch the requested document content from web content 130 and send the document to web browser 120 via network 150. In some embodiments, one or more web browsers 120 may be associated with users who are members of online community 140 and retrieve a document unique to the community from peer community web content 160 via community server 170 or web server 110.

Generally speaking, a web document may correspond to any document that is accessible via a URL that is associated with the document. Such a document may typically be retrieved according to a URL and displayed by an Internet-enabled application, such as a web browser, for example. In one embodiment, the web document may be formatted in Hypertext Markup Language (HTML). HTML is the predominant markup language for web pages. HTML describes the structure of a document by specifying certain text as headings, paragraphs, lists, forms, tables, embedded images and other objects. HTML includes labels, known as tags or elements that describe the appearance and semantics of a document. HTML may include scripting code (e.g., JavaScript™) that may affect the behavior of web browser 120. In some embodiments, the web document may be in a format different than HTML. Examples include Hypertext Preprocessor (PHP) scripting language, Active Server Pages™ (ASP), Extensible Markup Language (XML) or any other script, data format or language that may have an embedded reference to another document and may be interpreted by an Internet enabled application such as a web browser.

A web document may include one or more hyperlinks. A hyperlink may be an embedded reference or navigation element in a document to another section of the same document or to another document. An embedded reference may be a link embedded in an object such as hypertext or a hot area. A hot area may be an invisible area of the screen that covers a text label or graphical image. A hyperlink may start at a source anchor and point to a destination anchor. The most common type of destination anchor is a Uniform Resource Locator (URL). A URL may point to a document (e.g., web page) or a position within a web page or another resource.

Web browser 120 may typically be configured to display a hyperlink in some distinguishing way (e.g., different color, font or style). A user may activate the link by clicking on it with a mouse, or by performing another type of selection activity via a user interface. In response, web browser 120 may display the target of the link. In an HTML embodiment, the HTML code of the document may contain some or all of five main characteristics for an embedded reference. They include (1) a Link Destination, which identifies the pointed-to URL; (2) a Link Label, which identifies the visible, clickable text displayed for the hyperlink; (3) a Link Title, which is an attribute that adds information about the link; (4) a Link Target, which defines where the linked document will be opened; and (5) a Link Class or Link ID, which assigns a unique name to the element.

One example of an HTML-formatted hyperlink illustrating the aforementioned elements is as follows:
<a href="URL" title="link title" target="link target" class="link class">link label</a>
where the "href" field corresponds to the Link Destination. The HTML example is only one example of how an embedded reference may be formatted. Other formats, languages and/or scripts (e.g., other than HTML) are possible.

Normally, a user associated with web browser 120 will click on a link label and web browser 120 will attempt to open the target anchor pointed to by the link destination URL. If the URL points to a document or resource that does not exist, the web browser may display a "Page Not Found" error.

Web browser 120 may be a software application configured to display a web document. Web browser 120 may be implemented on a personal computer, server, cell phone, PDA or any other suitable device configured with a user interface display. Web browser 120 may enable a user to display and interact with text, images, videos, music and other information that can be included in or obtained via a web page. Some popular web browsers include Internet Explorer™, Mozilla Firefox™, Safari™, Opera™ and Netscape™, although the term "Web Browser" may correspond to any suitable Internet enabled browser or application. Web browser 120 may be used to access information provided by the World Wide Web (e.g., via the Internet) or information provided by private networks. Web browser 120 may communicate with web server 110 and community server 170 via hypertext transfer protocol (HTTP), secure HTTP, (HTTPS), Transport Layer Security (TLS) or another protocol to fetch web pages. Typically, web browser 120 initiates a request by establishing a Transmission Control Protocol (TCP) connection to a particular port (e.g., port 80) on a host (e.g., web server 110).

Web browser 120 may be implemented in a procedural programming language (e.g., C or C++) or an object oriented programming language (e.g., Java or C#) or another programming or scripting language executable on a computing device. In various embodiments, web browser 120 may utilize HTML, JavaScript™, AJAX, SOAP, ASP .NET, XML, TCP/IP, UDP or another suitable technology. Web browser 120 may be configured to communicate with other systems via network 150. In some embodiments, web browser 120 may be located on the same computer system as web server 110. In other embodiments, web browser 120 may be located on a system separate from server 110 and communicate with server 110 via network 150.

As described above, web browser 120 may be configured to utilize scripting code. One example of scripting code is JavaScript™. JavaScript™ is a scripting language that allows a web document author to write functions embedded in or included in web documents. JavaScript™ may interact with the Document Object Model (DOM) of the page. The DOM is a platform and language independent standard object model for representing HTML or XML and related formats. JavaScript™ runs locally within a web browser rather than on a remote server. JavaScript™ can respond to user actions in ways that HTML cannot. Some web browsers may include a JavaScript™ engine (e.g., interpreter) that interprets the JavaScript™ source code and executes the script. It is contemplated that in various embodiments, web browser 120 may be configured to utilize any suitable type of scripting language instead of or in addition to JavaScript™.

Generally speaking, web browser 120 may provide an environment in which web documents retrieved from web server 110 may be processed, manipulated, and displayed to a user. For example, the DOM representation of a web document may be stored and manipulated within the web browser's environment. The environment of web browser 120 may encompass functionality and/or data structures that are native to or built into web browser 120 itself, as well as functionality provided by complementary or third-party software that is configured to be incorporated within web browser 120 or to interoperate with web browser 120, such as plugins, toolbars, or widgets, for example.

The document environment provided by a particular instance of web browser 120 may be local to that instance of web browser 120. That is, the state of the document within the environment of a particular instance of web browser 120 may not be directly visible to or accessible by other entities, such as other instances of web browser 120 or servers 110 (although it is contemplated that a particular instance of web browser 120 may be configured to communicate information about the state of its environment to other entries on its own initiative).

It is contemplated that in some embodiments, a document may be modified within the web browser's environment. For example, as described in greater detail below, an original embedded URL reference in a document may be changed to a replacement embedded URL reference within that document. In some cases, state information relevant to a document may be persistent within the web browser's environment. For example, modifications to a document's content or appearance within the web browser's environment that are made on one occasion may be reflected when the document is retrieved and/or displayed on subsequent occasions.

Web server 110 may be configured to service requests from web browser 120. In some embodiments, web server 110 may be configured to listen on a port (e.g., port 80) waiting for a client, such as web browser 120, to send a request message. When the web server 110 receives a request for a document, web server 110 may be configured to access web content 130 to fetch the document and forward the document to web browser 120. Web server 110 may be implemented as one or more physical systems. Web server 110 may be configured to run special web server software configured to service web browser requests. Examples of popular web server software include Microsoft™ Internet Information Systems™ and Apache™, though any suitable web server software platform may be employed.

Web content 130 may include one or more web pages formatted in HTML or another suitable format. In addition, web content 130 may include images, videos and documents formatted in formats other than HTML. Web content 130 may be organized and stored as files on a file server, as records within a database (e.g., a relational database), or according to any other suitable organization. Web content 130 may be stored on the same physical system as web server 110 or may be located on one or more separate systems accessible by web server 110. Web content 130 may be implemented as one or more servers and/or as one or more storage devices. Generally speaking, documents that are stored within web content 130, or that are otherwise accessible by server 110 to be provided to a web browser's document request, may be referred to as being stored within the server environment or as the server's copy of the documents. In some embodiments, changes made to the server's copy of a particular document may be visible to some or all users who subsequently request the particular document via web browser 120.

As described in greater detail below, in some embodiments, two or more users of web browser 120 may be organized within a peer-to-peer community, a virtual community or an online community. An online community 140 may be defined as a social network of two or more users of web browsers 120 that communicate with one another via network 150 and share an affinity. An online community 140 may have access to their own peer community web content 160, which may include one or more web pages and/or other content. In some embodiments, a user belonging to online community 140 and associated with web browser 120 may access community server 170 to access peer community web content 160.

Community server 170 may be configured as a web server similar to web server 110, although configured to serve peer community web content 140 to online community 140. In some embodiments, the features described above with respect to web server 110 functionality or interaction with other systems may apply to community server 170 as well.

In various embodiments, network 150 may be configured to allow data to be exchanged between web browser 120, web server 110, web content 130 and peer community web content 160. Network 150 may correspond to various methods of communication between entities and may include, but is not limited to communication via telephone, fax, email, messages (e.g., instant messaging), voice messages, and electronic documents (e.g., web page, email or file transfers). In general, network 150 may represent any method that one entity may utilize to communicate with another entity. While network 150 may be illustrated in a generalized manner, one of ordinary skill in the art will recognize that network 150 is meant to be representative of a complete communication path between the entities depicted in FIG. 1 with a specific type of communication channel. For example, network 150 may represent one or more communications channels and may include one or more telecommunications networks as well as various data networks. Network 150 may include network devices such as circuits, switches, routers, hubs and/or gateways. Network 150 may support communication via wired or wireless general data networks, such as any suitable type of network including the Internet and/or Ethernet LAN; via telecommunications/telephony networks such as analog voice networks or digital fiber communications networks; via storage area networks such as Fiber Channel SANs, or via any other suitable type of network and/or protocol. Web page content may be transmitted on network 150 using Hyper Text Transport Protocol (HTTP), Secure Hyper Text Transport Protocol (HTTPS), Secure Socket Layer Protocol (SSL), Transport Layer Security Protocol (TLS) or another suitable network transport protocol. In various embodiments, the services described herein may utilize cryptographic protocols and algorithms when communicating over network 150.

In one example of how one embodiment of the system of FIG. 1 may work, a user associated with web browser 120 may request a document from web server 110. Web server 110 may retrieve the document from web content 130 and send the document to web browser 120. The user associated with web browser 120 may select a URL reference to another web page. The target document may no longer exist, resulting in the web browser displaying a "Page Not Found" error. Alternatively, the target document may not be the best version of the document to reference (e.g., the target of the existing reference may be outdated, or the user may know or suspect that a better reference exists). The user may find the correct or desired link and display the original document with the original URL reference. The user may select the existing link and press a key sequence or select a menu item initiating a pop-up dialog box within the web browser. The dialog box may allow the user to enter a replacement URL reference. Web browser 120 may replace the original embedded URL reference in the page source of the web document with the replacement embedded URL reference. Web browser 120 may store (e.g., locally on the user's system) an association of the original embedded URL reference with the replacement embedded URL reference and display the document with the replacement embedded URL reference. When the user selects the reference in the document, web browser 120 may retrieve and display the document pointed to by the replacement URL reference.

Subsequently, when the user requests the document with the original embedded URL reference, the web browser may receive the document from web server 110 and replace the original embedded URL reference with the replacement embedded URL reference and display the document with the replacement URL reference. In one embodiment, the replacement URL reference may be substituted for the original URL reference only within the original document for which the replacement URL reference was originally specified. In another embodiment, the replacement URL reference may be substituted for the original URL reference within any document or subset of documents in which the original URL reference appears.

In some cases the user may not have permission to change the document on the web server. Web browser 120 may send a request to the web server 110 (e.g., where the document was retrieved) requesting the original embedded URL reference be replaced by the replacement embedded URL reference.

In some embodiments, web server 110 may receive a request to change at least one or more original embedded URL references in a document to a corresponding replacement one or more embedded URL references, for example within web content 130. In response to determining the change is valid, the web server may change at least one or more original embedded URL references in the document to the corresponding at least one or more replacement URL references. Determining whether the change request is valid may be accomplished in many ways. In one example, an administrator associated with the web server may verify that the original embedded URL reference is broken and the replacement URL reference is correct, and then change the document source. In another example, the web server may receive one or more requests to change the original URL reference to a replacement URL reference. When web server 110 receives a number of requests equal to a threshold, web server 110 may automatically change the original URL reference in the document to the replacement URL reference. In some embodiments, weighted values associated with the authority of users making the request may be used to determine when a change request is valid. Some users may have a higher authority level than other users and therefore their requests may be more heavily weighted. For example, the past history or reputation of some users (e.g., as assessed by their peers and/or by the content owner) may be such that these users are more trustworthy or credible and that their replacement requests should be given greater consideration, as reflected by a weight or other metric of reliability, credibility, or trustworthiness that may be associated with such users. In another embodiment, the recency of the request may be taken into consideration. For example, recent requests may be more heavily weighted than old requests, and thus may factor more significantly in determining whether to accept a request. Other methods of determining a change is valid have been contemplated.

Online Communities

In some embodiments, two or more users of web browser 120, or another suitable client-side application, may be in a peer-to-peer community. These peer-to-peer communities may be known as virtual communities, e-communities or online communities. An online community may include a group of people that primarily interact using the Internet as a communication media rather than interacting face to face. Many different means are used to facilitate online communities including chat rooms and forums that may utilize text, voice, video, and/or avatars.

Frequently, online communities share an affinity. In one example, some users of web browser 120 may have similar browsing activities as detected by a web tracking system, and their membership within an online community may be defined in terms of the similarity in their browsing activity. In another example, users of web browser 120 may explicitly identify themselves as sharing an affinity (e.g., as dog lovers), for example, by forming a new community or joining an established community associated with that that affinity. In another example, users of web browser 120 may have similar shopping habits (e.g., they may browse for or purchase similar items via an electronic commerce web site or portal), and their membership within an online community may be defined in terms of the similarity of their shopping habits. Any other type of affinity may be common to the members of an online community, and in some instances, community members may share little affinity beyond simply being members of that particular community. That is, in some instances, online community membership may be ad hoc. Various examples of online communities that may be employed in conjunction with the system of FIG. 1 are described in greater detail in U.S. patent application Ser. No. 11/478,919, entitled "METHOD AND SYSTEM FOR DISPLAYING INTEREST SPACE USER COMMUNITIES" and filed on Jun. 30, 2006, which is hereby incorporated by reference in its entirety. It is noted that in some embodiments, some members of online community 140 may be associated with client-side applications other than conventional, full-featured web browsers. For example, such members may be associated with standalone applications (e.g., instant messaging applications, dedicated network-aware applications, document readers such as Adobe Acrobat Reader™, etc.) that support interaction with various types of documents and other types of network-delivered content.

In one embodiment, community server 170 may be configured to store and maintain information pertaining to the configuration of an online community such as online community 140. For example, community server 170 may be configured to store information regarding community membership, affinity information, or other community-related information. In some embodiments, community server 170 may be configured to facilitate communication among members of online community 140, for example, via chat rooms, instant messaging, or other suitable schemes. Also, in some embodiments it is contemplated that the functionality implemented in a centralized (e.g., client/server) fashion by community server 170 may instead be implemented in a distributed (e.g., peer-to-peer or serverless) fashion via web browsers 120 and/or by applications local to each member of the community.

Community membership may be implemented according to any suitable model. In some embodiments, online community membership may be implemented by invitation. For example, community server 170 may be configured to determine that various users share an affinity (e.g., according to their historical usage of network-based content, their expressed preferences, or other behavioral data) and may invite those users to join one or more communities appropriate to their shared affinities. In other embodiments, online community membership may be implemented through member self-management. For example, existing members of communities may moderate community membership to determine whether to allow new members to join or to expel existing members. In some embodiments, users may elect to join online communities on their own initiative, e.g., through self-selection. In one such embodiment, an online community may potentially encompass all potential users of web documents (e.g., the set of all Internet users).

Generally speaking, information conveyed from one community member to some or all other community members may be referred to as notification of the online community. In various embodiments, such notification may be conveyed directly to members (e.g., in a peer-to-peer fashion) or indirectly (e.g., via a server). Such notification may occur in a "push" fashion, such that other members may receive the notification irrespective of whether they actively request it. For example, community members may subscribe to receive notifications related to the community, such as by communicating a subscription request to community server 170 or another service, and may thereafter receive notifications without further action on their part. In some embodiments, subscriptions to notifications may allow filtering of notifications (e.g., by keyword, by an identifier of the origin of the notification, or by any other suitable criterion or combination of criteria). In such embodiments, a given community member may only receive those notifications that satisfy the subscription filtering criteria, rather than all notifications pertinent to the community. Notification may also occur in a "pull" fashion, such that a given member may receive the notification only if it requests it (e.g., by polling peers or a server for pending notifications).

In some embodiments, only certain users (e.g., users associated with web browser 120B and web browser 120C) may be members of online community 140, whereby only the members of online community 140 may have access to and share peer community web content 160. Peer community web content 160 may include web documents, text, video, voice or another suitable data type. In one embodiment, peer community web content 160 may include all or a portion of the content included in web content 130, along with additional information reflecting changes, such as replacement URLs, that may be generated by members of online community 140. For example, peer community web content 160 might include a copy of some or all of a document included in web content 130 for which one or more members of online community 140 have submitted replacement URLs. In another embodiment, peer community web content 160 may be configured to store information about the differences between an original document as stored in web content 130 and a revised document that reflects replacement URLs. For example, rather than store a substantial duplicate of an original web document, peer community web content 160 may be configured to store a reference to the original document within web content 130, as well as information detailing how the revised document differs from the original, such as the locations and content of replacement URLs within the document.

In some embodiments, peer community web content 160 may be stored in a separate, distinct repository from web content 130, for example as distinct records stored on a distinct system. In other embodiments peer community web content 160 may be combined with or be the same content as web content 130. For example, peer community web content 160 may be stored on the same system as web content 130, or may be intermingled with web content 130, such as in the form of document metadata. In some embodiments, only web browsers in online community 140 may be configured to submit and view dynamically changed URLs, or to access peer community web content 160.

In one embodiment, a community member's request for peer community web content 160 may be facilitated by web server 110. For example, a user associated with web browser 120B may make a request for a web document from web server 110. Web server 110 may fetch the document from web content 130 and also fetch differences or changes to the document that are unique to online community 140 from peer community web content 160. Web server 110 may combine the original document retrieved from web content 130 with the changes retrieved from peer community web content 160 and send the results to web browser 120B. In a variation of the example above, web server 110 may send the original web document (from web content 130) and the differences (from peer community web content 160) to web browser 120B and web browser 120B may combine the original document with the differences and display the results on a user interface.

In another embodiment, access to peer community web content 160 may be facilitated by community server 170 in a manner that may be transparent to web server 110. For example, web browser 120B may request an original document from web server 110, which may fetch the document from web content 130 and then send the document to web browser 120B. Web browser 120B may also request differences or additional data from community server 170, which may fetch the differences from peer community web content 160 and send the differences to web browser 120B. Web browser 120B may combine the original data and the differences and display the results on a user interface. In such an embodiment, it may be possible to implement community-based features, such as community-derived replacement URLs for web documents, in a manner that is transparent to the source of the content. It is contemplated that many other variations of fetching peer community content 160 are possible.

In some embodiments, a request to change at least one or more original embedded URL references to at least one or more replacement URL references for an online community may be sent from web browser 120 to peer community web content 160. In this case, one peer (e.g., a user associated with web browser 120), two or more peers, or any peer may be authorized to approve the request such that after approval, the original embedded URL reference is replaced by the replacement URL reference. Subsequently, when the document containing the original embedded URL reference is downloaded from peer community web content 160 and displayed by web browser 120, the replacement URL reference may be included in the document.

In some embodiments, one peer (e.g., web browser 120B) may make the document with the replacement embedded URL reference available to a selected one (e.g., web browser 120C) or more peers. In other embodiments, one peer may make the document with the replacement embedded URL reference available to all peers in the online community 140. In some embodiments, peers may share replacement information without sharing entire documents. For example, peer community web content 160 may contain metadata, differences or changes corresponding to web content 130. In this example, web server 110 may retrieve a web document from web content 130 and apply changes to the document found in peer community web content 160. The modified or changed document may then be sent to web browser 120. In this example, peers may share replacement information without sharing entire documents.

Dynamically Changing Web URLs

Figure 2:
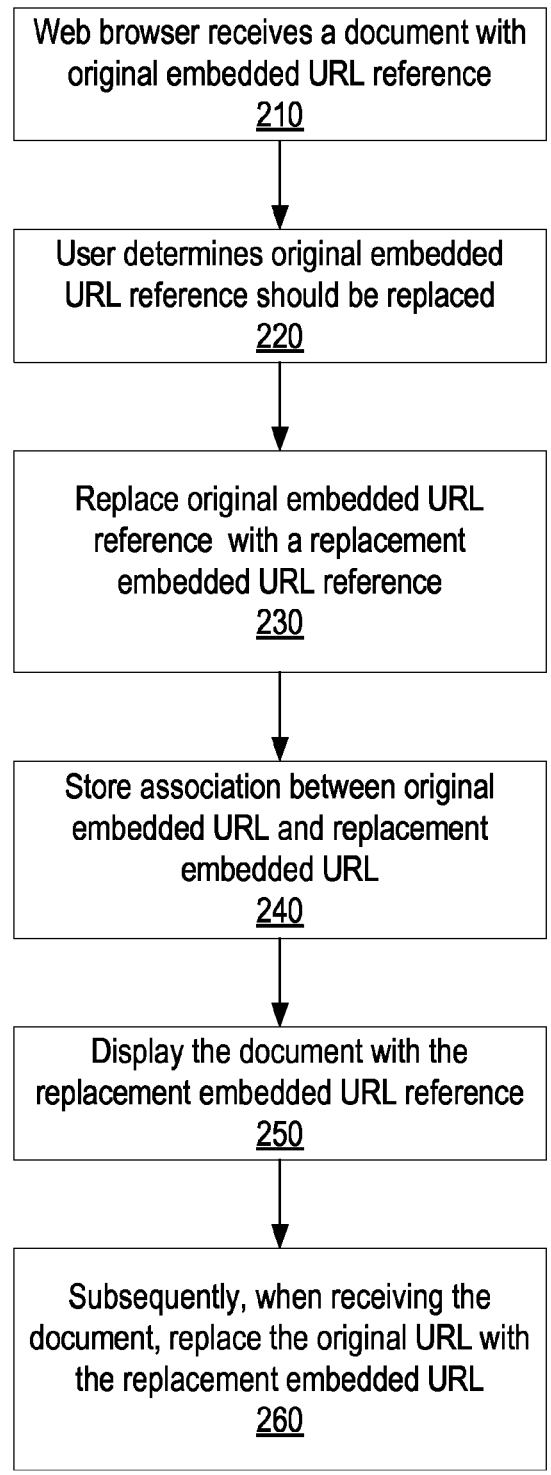
FIG. 2 is a flow diagram illustrating dynamically changing web URLs, according to some embodiments.

FIG. 2 is a flow diagram illustrating dynamically changing web URLs, according to some embodiments. Web browser 120 may receive the document from web server 110 and may display the document on a user interface. As shown in block 220, a user associated with web browser 120 may determine one or more of the original embedded URL references should be replaced. For example, the link may be broken, such that the user may receive an error message or unexpected content upon selecting it. In some cases, a user may determine an original embedded URL reference is not a broken link, but rather is a sub-optimal link. For example, as mentioned above, the link may refer to content that is in fact available, but is obsolete or otherwise less suited to the user's needs than a different document would be. In this case the user may find a better link with which to replace the existing link. In another case, a user may preserve the link's relationship to the targeted document, but may add something to the link, such as an annotation. For example, the user may elect to alter the link label's descriptive text, thus altering the way the link appears in the document, or the user may elect to alter any other suitable property of the link.

In various embodiments, web browser 120 may be configured to display a dialog box, window or pop-up to receive user input in order to replace the original URL reference with a replacement URL reference in the page source of the web document, as shown in block 230. Web browser 120 may configured to allow a user to select the URL to change from a list of displayed URLs included in the web document, or select the reference with the mouse while pressing a certain key on a keyboard. In various embodiments, the replacement reference may modify or annotate any suitable property of the reference, such as the targeted document or the link label, for example. Web browser 120 may display a dialog box and receive a replacement embedded reference from a user. (See the example illustration in FIG. 3A.) Web browser 120 may interact with JavaScript™, or another suitable script or language to change the original embedded URL to a replacement embedded URL. In some embodiments the scripting language may have been inserted into the web document by the original author to enable a user to change an original embedded URL, and/or to enable the user to interact with a third party service (e.g., community server 170, community peers, or another service) to dynamically replace the original URL. In other embodiments, the original web document author may not have added a scripting language to the web document. In one such embodiment, web browser 120 may be configured to search for all instances of a specific attribute in the web document (e.g., all "href" attributes) and display the list in a list box. The user associated with web browser 120 may select one or more references to change and enter the replacement embedded reference into a dialog box in web browser 120. Web browser 120 may replace selected original embedded URL reference with the replacement embedded URL reference. For example, the scripting functionality that implements the user interface through which the user indicates a replacement URL may modify the representation of the document (e.g., by modifying the DOM of the document) to reflect the replacement URL. The description above is given as one example. Many variations have been contemplated.

As mentioned below, in one particular embodiment, a web page author may specifically identify references that a user is allowed to dynamically modify, for example by denoting such references with a tag other than the HTML standard "href" tag. In one such embodiment, a user may be restricted from modifying URL references other than ones indicated as dynamically modifiable. In other embodiments, dynamic URL replacement may be supported with respect to any URL reference that occurs within a document.

In some embodiments, support for the URL replacement functionality and associated user interface may be implemented within the functionality of web browser 120 or obtained from a third party source instead of being embedded within the source of the original document. For example, in various embodiments, web browser 120 may be configured with an add-on toolbar, widget, component (e.g., Flash™ or Active-X™), or a drag-and-drop object that can be dropped into a displayed web document within web browser 120 for the purpose of changing an original embedded URL to a replacement embedded URL. Web browser 120 may interact with the add-on to display some or all URLs within a web document. The user associated with web browser 120 may select one or more original embedded URLs, enter a replacement embedded URL and submit the change. Subsequently, web browser 120 configured with the add-on may change the page source such that the original embedded URL reference is replaced by the replacement embedded URL reference.

After changing the original embedded URL with the replacement embedded URL, web browser 120 may store a record of an association of the original embedded URL and the replacement embedded URL. The record of the association may be stored in the web browser's cache, an XML file, a cookie or may be persisted to a storage device or stored in any other suitable fashion, as shown in block 240. (See the description below for FIG. 3D regarding one example of the URL association data format.) In some embodiments, it is contemplated that the record of the association need not be stored on the same system on which web browser 120 executes. For example, the record may be stored in a distributed fashion among online community members, or the record may be communicated to community server 170 or to a third party service, such as a web service.

Web browser 120 may display the document with the replacement embedded URL reference as shown in block 250. Subsequently, when receiving the document, web browser 120 may retrieve the record of the association from storage (e.g., from the browser's internal data structures or local cache, or from a different service or system) and replace the original URL reference with the replacement URL reference before displaying the document.

In one embodiment, web browser 120 may retrieve another document (e.g., different than the original document) with the same, original embedded URL reference. In this embodiment, web browser 120 may replace the original URL reference with the replacement URL reference for the document (or any document) that contains the original URL reference.

Figures 3A, 3B, 3C:
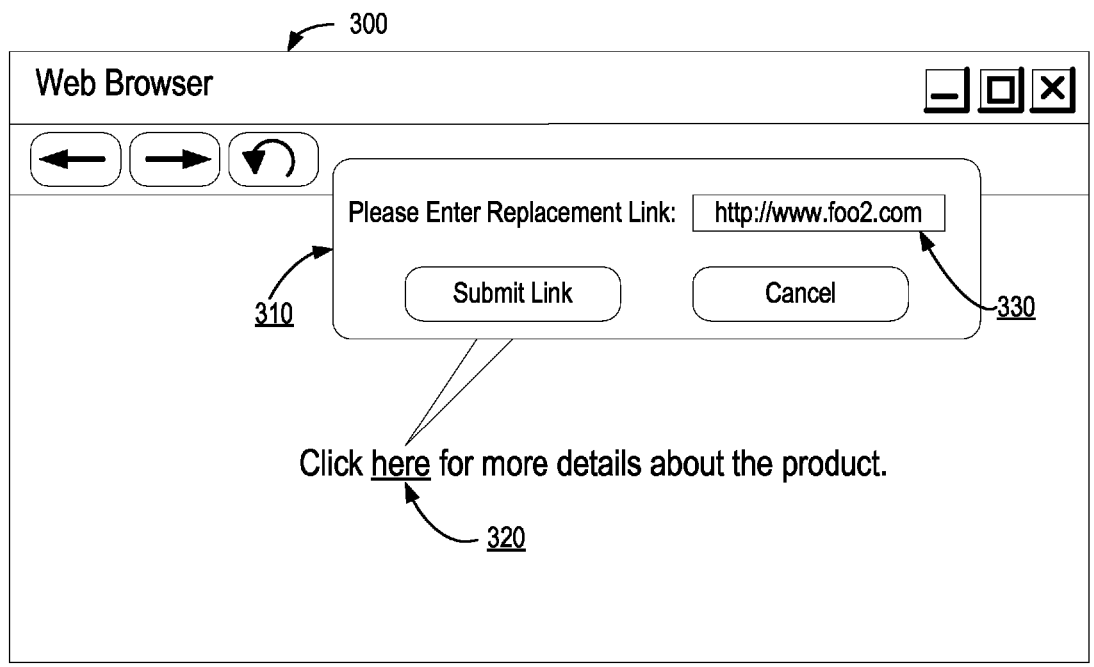
FIG. 3A is a screen illustration of a web browser dynamically changing web URL references, according to some embodiments.
FIG. 3B is an illustration of HTML source code with a reference to a "Broken Link", according to some embodiments.
FIG. 3C is an illustration of HTML source code with a reference to a dynamically changed replacement URL, according to some embodiments.

FIGS. 3A-3C are screen illustrations of one example of a web browser dynamically changing web URL references, according to some embodiments. In this example, item 300 in FIG. 3A is a web browser 120 displaying a web document. The web document may contain the HTML code shown in FIG. 3B. The "href" reference in the code points to the target http://www.foo1.com as shown at item 335 in FIG. 3B. In this example, a user associated with web browser 120 may click on the word, "here" (item 320). Web browser 120 may attempt to retrieve the page located at http://www.foo1.com (item 335 in FIG. 3B). In this example, www.foo1.com may not exist, resulting in a, "Page Not Found" error (not shown in the figures). The user associated with web browser 120 may determine the correct URL and may select a menu item within the web browser to display a dialog box (item 310) to change the original embedded URL reference locally to a replacement embedded URL reference. In this example, http://www.foo2.com (e.g., the correct URL) may be entered by the user into the dialog box as shown at item 330. Web browser 120 may change its representation of the page source of the document and replace http://www.foo1.com with http://www.foo2.com as shown at item 337 in FIG. 3C. Web browser 120 may store a record of an association of the original URL reference (e.g., http://www.foo1.com) with the replacement URL reference (e.g., http://www.foo2.com). Subsequently, when the document is retrieved and displayed, web browser 120 may replace http://www.foo1.com with http://www.foo2.com.

FIG. 3B and FIG. 3C are given as very simplistic examples of HTML code to demonstrate changing an original embedded URL reference with a replacement embedded URL reference. In the various embodiments, scripted functionality (not shown in the figures) may be downloaded with the page source. In one example, when the user enters a replacement link (item 330) in dialog box 310 and presses the "Submit Link" button, web browser 120 may invoke the scripted functionality (e.g., Javascript™), which may interact with the Document Object Model (DOM) to change the original embedded URL reference (item 335) to the replacement embedded URL reference (item 337). In this example, the original author of the web document may include scripting language in the web document with the original embedded reference so that users associated with web browser 120 may have the option of changing an original embedded reference to a replacement embedded reference. As noted above, in other embodiments, the functionality for changing an original embedded URL reference to a replacement URL may be supplied by web browser 120 or an extension to the browser (e.g., a plugin, widget, or other suitable extension) instead of being coded within the document source as scripted functionality.

In various embodiments, a "dref" reference may be used in the web document source code to indicate a reference that may be dynamically changed. The "dref" reference may function the same way as an "href" reference, however, the "dref" reference may also indicate a reference that may be dynamically changed. The "dref" tag is used as an example; other tags have been contemplated.

Figures 3D, 3E:
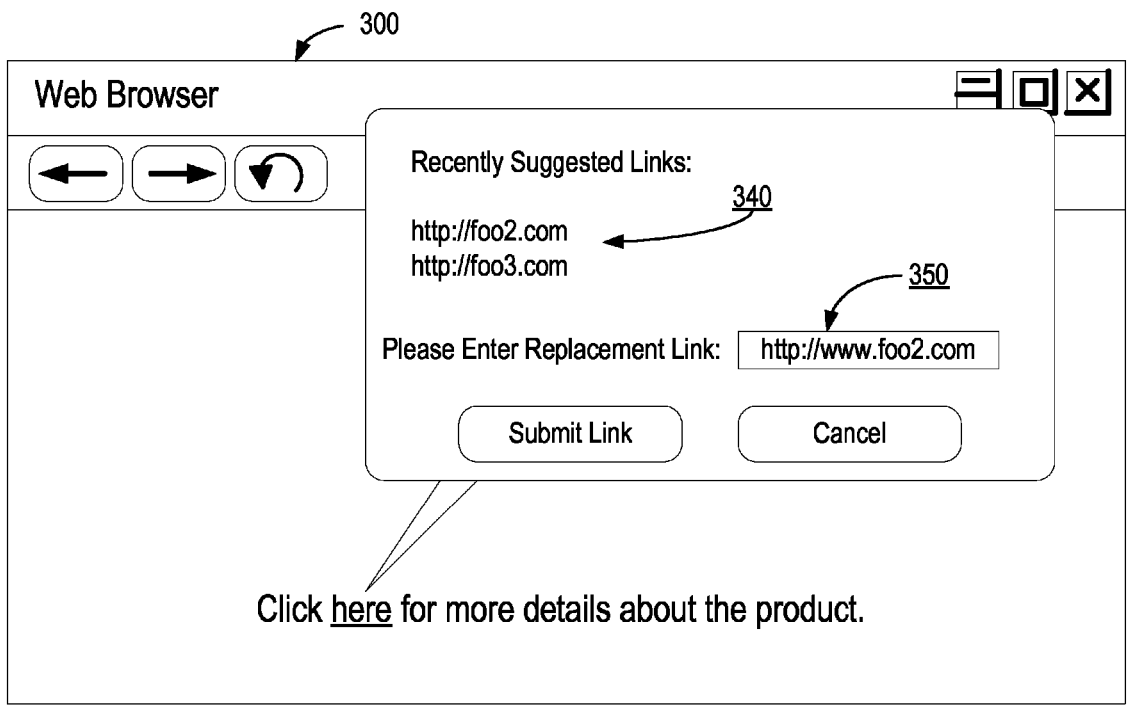
FIG. 3D is a block diagram illustrating an association between an original URL and a replacement URL, according to some embodiments.
FIG. 3E is a screen illustration of a web browser dynamically changing web URL references, according to some embodiments.

FIG. 3D is a block diagram illustrating one embodiment of a record of an association between an original embedded reference and a replacement embedded reference. As described above, web browser 120 may be configured to store a record of an association containing the references (i.e., original and replacement) locally. FIG. 3D shows two associations in one embodiment of a record format. The first association is for the web document titled, "Index.htm". The original embedded URL is http://www.foo1.htm and the replacement embedded URL is http://www.foo2.htm. The date of the first replacement association is Jan. 1, 2008 and the date of the second replacement association is Jan. 2, 2008. The association may be stored in any suitable format. Examples include a Extensible Markup Language (XML) record, a browser cookie, the web browser 120 cache, or a file or database. FIG. 3D is given as one example. Many other implementations are possible, including storing more or fewer data elements.

As described above, in some embodiments, web server 110 may collect requests to change original embedded URL references to replacement embedded URL references. One or more web browsers 120 may submit a request to web server 110 to change the original document that contains the broken link. The submitted requests may notify the web server 110 that a broken link is in the document. In some embodiments, web server 110 may maintain a count of the most frequently requested change requests. For example, web server 110 may collect ten requests to change the URL http://www.foo1.com to http://www.foo2.com and five requests to change http://www.foo1.com to http://www.foo3.com. When web browser 120 requests a document from web server 110, web server 110 may send the most requested replacement URL references as part of the document (e.g., within scripting code). Alternatively, web browser 120 may separately request suggested URL replacements for a document from web server 110.

If the user associated with web browser 120 determines an original embedded URL reference is broken, the user may display a dialog box to change the reference, as shown in FIG. 3E. In this example, the most requested replacement URL references (e.g., item 340) may be displayed as suggestions for the user to select. These references (e.g., http://foo2.com and http://foo3.com) may have been included in the document that was downloaded to web browser 120 (e.g., in JavaScript™). When the user associated with web browser 120 displays the dialog box to change the original embedded URL reference to the replacement URL reference, web browser 120 may interact with the scripting code and may retrieve and display the most frequently suggested links as shown at item 340. In some embodiments, community server 170 or another entity distinct from web server 110 may maintain information regarding suggested replacement URL references. In such embodiments, web browser 120 may be configured to request such information from the appropriate entity.

Figure 4:
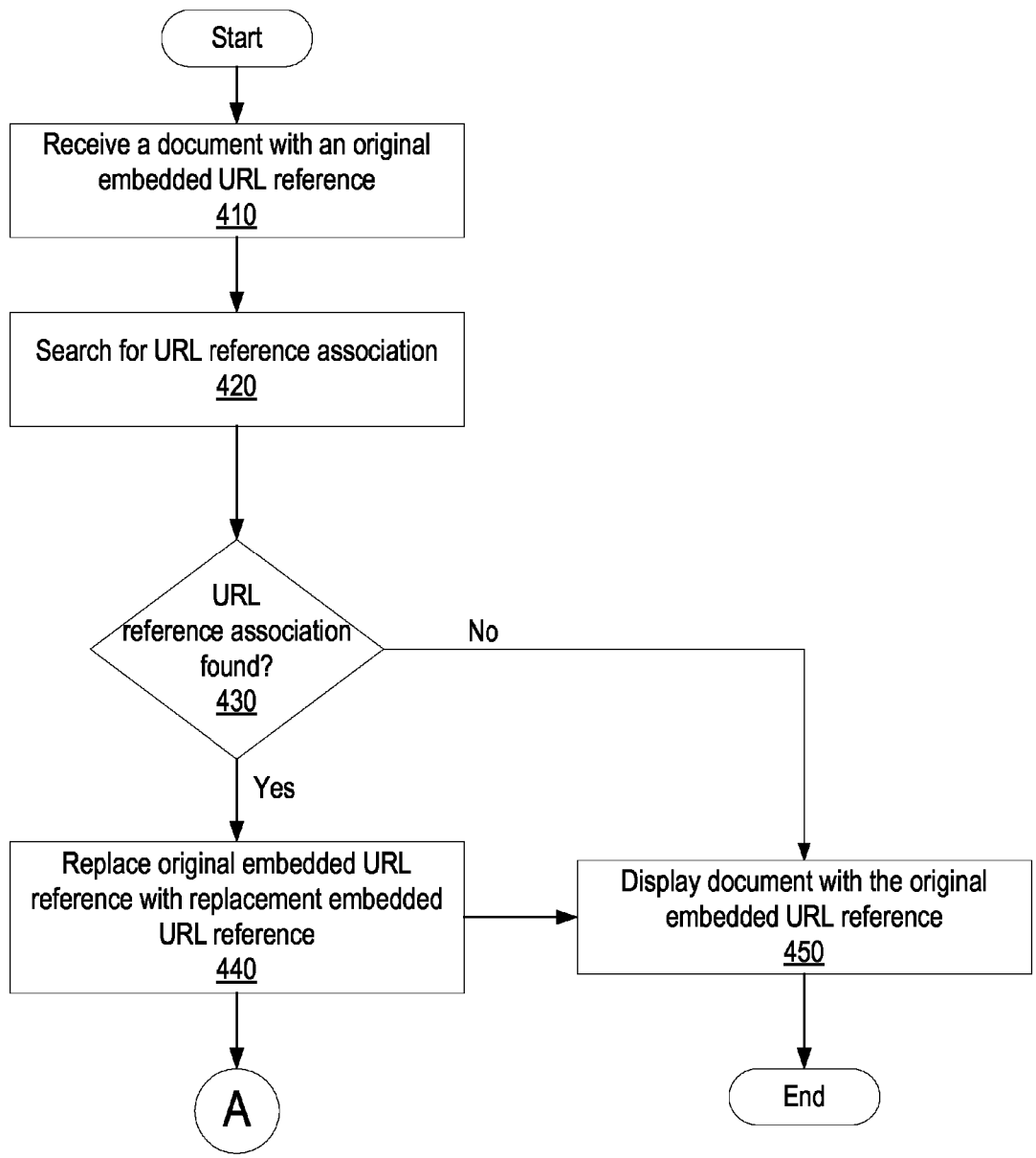
FIG. 4 is a flow diagram illustrating a web browser receiving a document and replacing an original URL reference with a replacement URL reference, according to some embodiments.

FIG. 4 is a flow diagram illustrating a web browser 120 receiving a document and replacing an original URL reference with a replacement URL reference, according to some embodiments. In this example, web browser 120 may have previously stored a record of an association between an original embedded URL reference and a replacement embedded URL reference. As described above, the association may have been stored in a cookie, an XML file, web browser 120 cache or another suitable data store. At item 410, web browser 120 may receive a document with an original embedded URL reference or another data element of the association. Web browser 120 may search for record of a URL reference association that was previously stored, as shown in block 420. In some embodiments, the reference association may be stored according to a key, hash value or index on the original embedded URL reference. If record of an association is not found, (block 430) the flow goes to block 450 and the document is displayed with original embedded URL reference. If a record of an association is found, the original embedded URL reference is replaced with the replacement embedded URL reference as shown in block 440.

In some embodiments, more than one embedded URL reference may be included in a single document. In this case, each original embedded URL reference may be replaced by its respective replacement embedded URL reference in the single document. In other embodiments, the same embedded URL reference may be included in the same document multiple times. In this case, each instance of the original embedded URL reference may be replaced with the replacement embedded URL reference. As mentioned above, in some embodiments, an original embedded URL reference may occur in multiple different documents, and may be globally replaced across the multiple documents, e.g., when they are retrieved for display.

Figure 5:
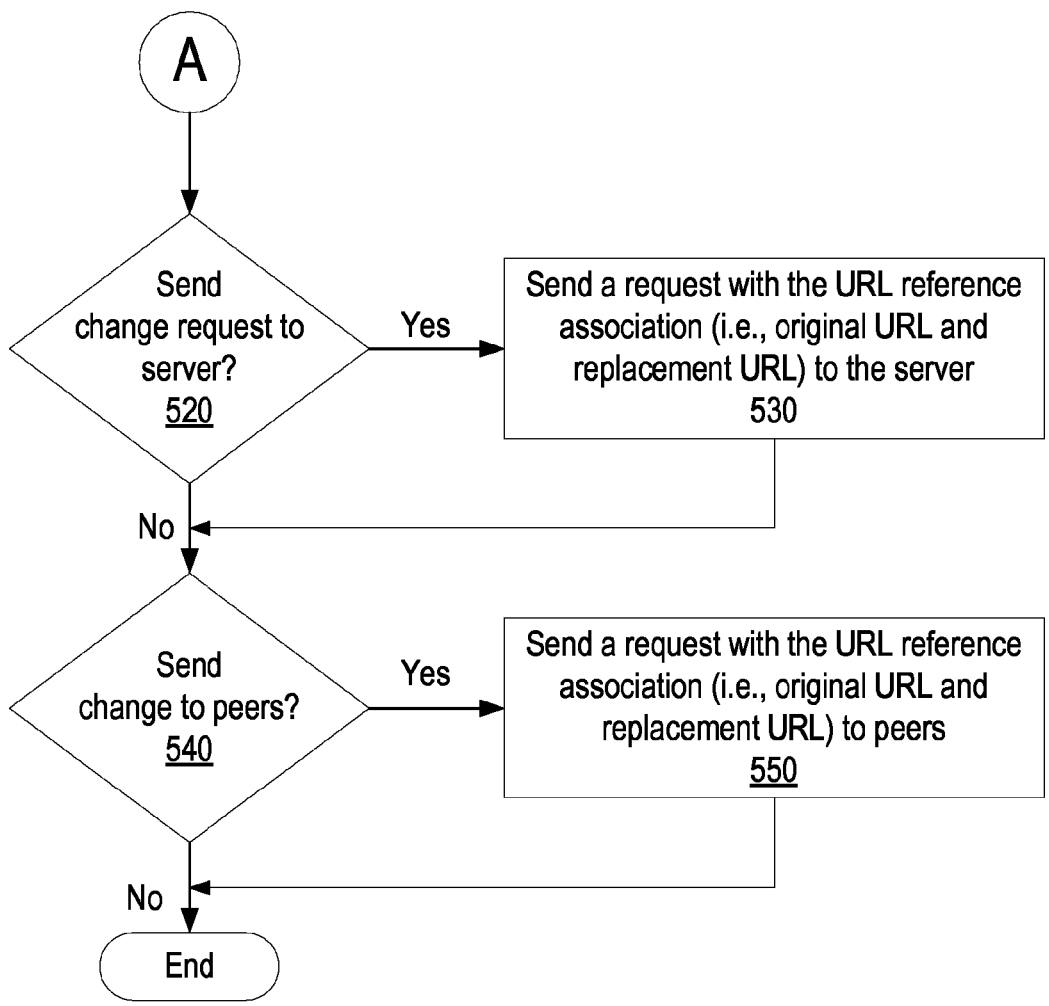
FIG. 5 is a flow diagram illustrating a web browser sending a request to change an original URL reference to a replacement URL reference to a server, according to some embodiments.

FIG. 5 is a flow diagram illustrating a web browser 120 sending a request to change an original URL reference to a replacement URL reference to a server 110, according to some embodiments. In some embodiments, after web browser 120 replaces an original embedded URL reference with a replacement embedded URL reference (see FIG. 4), web browser 120 may send a request to web server 110, requesting the original embedded URL reference be replaced with the replacement embedded URL reference. In some embodiments, web browser 120 may display a dialog box asking the user if he or she would like to send the request, as shown at block 520. In other embodiments, web browser 120 may send the request to web server 110 without interacting with a user. As shown in block 530, web browser 120 may send a request with the URL reference association to web server 110. In one example, sending the request may be implemented as a web service call from web browser 120 to web server 110. Other implementations have been contemplated. In particular, it is noted that in an embodiment configured for standalone operation, information about replacement URL references may be managed locally by web browser 120 without being reported to an external server such as web server 110 or community server 170.

As described above, in some embodiments a user associated with web browser 120 may be included in an online community. In some such embodiments, requests to change URL references may be submitted to peers within the online community. For example, such requests may be exchanged among peers in a peer-to-peer fashion, or may be submitted for storage within peer community web content 160, from which they may be centrally accessed. In some such embodiments, web browser 120 may present the user an option to submit such a request as shown in block 540. If the user's response is "Yes", a request with the URL reference association may be sent to peer community web content 160 as shown in block 550. In one embodiment, requests indicating replacement URLs that are submitted to an online community may form the basis for suggestions received by community members from the community. For example, if one community member discovers a broken URL or a sub-optimal URL and submits a suggested replacement to the community, other members of the community may be notified of the suggestion if they should encounter the broken URL themselves, thus benefiting from the collective experience of other community members.

In some embodiments, notifications regarding replacement URL references that are conveyed by community members to the online community may include records that are similar or identical to the record of the association between the original URL reference and the replacement URL reference that web browser 120 may store (e.g., as described above with respect to FIG. 3D). In other embodiments, notifications regarding replacement URL references among online community members may be made using records or indications of any other suitable format.

As a result of notifications to the online community, web browsers 120 or other client-side applications that are associated with users who are members of an online community may receive notifications regarding replacement URL references for various documents. In one embodiment, subsequent to receiving such a notification with respect to a particular document from the online community, web browser 120 may be configured to receive the particular document (e.g., from web server 110) and to automatically replace, within the particular document, the original URL reference with the replacement URL reference indicated in the notification. Thus, in some instances, one community member's replacement of a particular URL reference may be propagated to other community members without requiring active participation on the part of the other community members. In some embodiments, it is contemplated that community members may select a degree to which they wish to see the effects of other members' URL replacements. For example, a given community member may allow such replacements from some community members but not others. As described above, notifications within the online community may be performed in a "push" fashion or "pull" fashion.

In some embodiments, different communities may have control over their own replacement URLs, such that each online community may have different replacement links, respective to their community. For example, a web site may have a link to an image captioned "The World's Greatest Car", which may link to an image of Car-X. In this case, the link to the image of Car-X is the original embedded URL reference. The Car-Y online community may replace the original embedded URL with a replacement URL link to an image of Car-Y and the Car-Z online community may replace the original embedded URL with a replacement URL link to an image of Car-Z. When, "The Worlds Greatest Car" link is selected, web browsers associated with members of the Car-Y community may retrieve and display the image of Car-Y and web browsers associated with members of the Car-Z community may retrieve and display the image of Car-Z.

Thus, it is contemplated that through the participation of their members in replacing URLs, different online communities may develop different perspectives or views of a particular document. That is, community members may be presented with a version of the document that reflects the preferences of their community. If a particular user is a member of more than one online community, it is possible that different replacement URLs may be provided for the same original URL from the different communities. In various embodiments, conflicts among multiple replacement URLs may be resolved by displaying all or a subset of the replacements, allowing the user to prioritize replacements from one community over another, or using any other suitable scheme.

Figure 6:
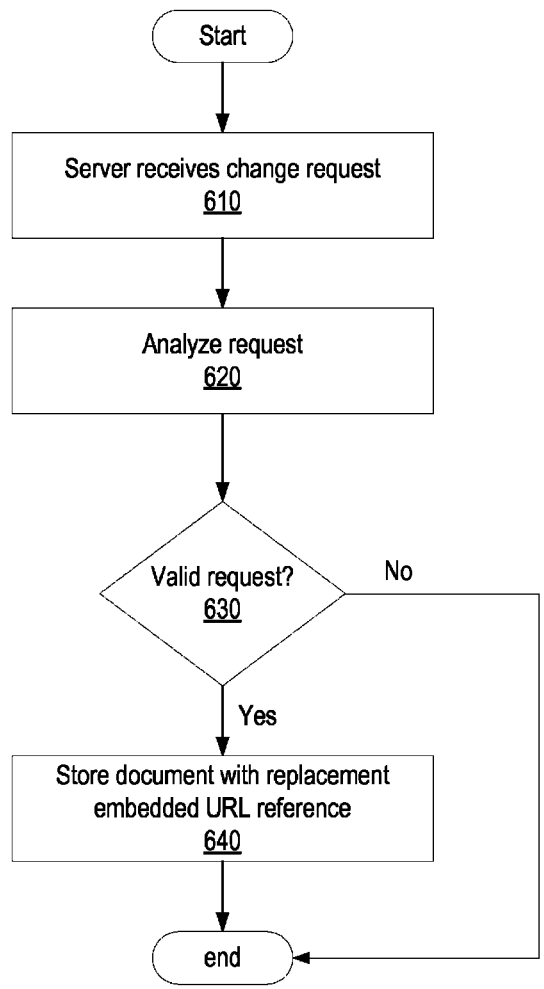
FIG. 6 is a flow diagram illustrating a server receiving a request to change an original URL reference to a replacement URL reference, according to some embodiments.

FIG. 6 is a flow diagram illustrating a server receiving a request to change an original URL reference to a replacement URL reference, according to some embodiments. As described above, web server 110 may be configured to serve web documents to requestors and may receive a request to change at least one or more original embedded URL references in a document to a corresponding at least one or more replacement embedded URL references, as shown in block 610.

As shown in block 620, the request may be analyzed to determine if the request is valid. In one example, an administrator associated with web server 110 may analyze the request to determine if the original embedded URL reference is valid. The administrator may check the replacement embedded URL reference included in a request to determine if it is valid for replacing the original URL reference. If the replacement URL reference is valid, the administrator may change the document to include the replacement embedded URL reference. In another example, web server 110 may be configured to determine the request is valid (block 630) when the number of requests to change the original embedded URL reference to the same corresponding replacement URL reference satisfies a threshold (e.g., by equaling or exceeding the threshold). The threshold may be an integer value. Web server 110 may detect the threshold has been reached and change the original embedded URL reference to the replacement embedded URL reference as shown in block 640. In another embodiment, the request may be determined to be valid if one or more trusted users of a community make the request. In this embodiment, all requests from trusted users may be designated as valid. Trusted users may be flagged by a system administrator or determined based on a history or reliability metrics. When web server 110 detects a trusted user has submitted a request, it may determine the request is valid. In another embodiment, users may be assigned an authority value, such that one user may have a higher authority value than another user and therefore the request from user with the higher authority value may be weighted more heavily than the request from a user with a lower authority value. For example, as noted above, an individual user such as a community member may be associated with a metric that reflects that user's credibility or trustworthiness, and by extension, the user's degree of relative authority to propose changes to URLs. In another example, the recency of the request may determine the weight of the request, such that a recent request may be weighted more heavily than an old request. In other embodiments, various other metrics may be employed to determine whether or not a request to change a URL should be honored or ignored.

Additionally, it is contemplated that in some embodiments, the method of FIG. 6 may be implemented by a server other than web server 110, such as community server 170, for example. That is, in some embodiments, the analysis and validation of requests to change URL references for a particular document may be performed by a system that is distinct from the system responsible for hosting or serving the document. Further, in some embodiments, the processing of requests to change URL references for a particular document may be performed in a manner that is transparent to the system responsible for hosting or serving the document. For example, community server 170 or another system may process change requests and provide replacement URL information to members of an online community entirely independently of the operation of web server 110, such that URL replacement functionality may be implemented without the intervention or knowledge of web server 110.

Computing Device Description

Figure 7:
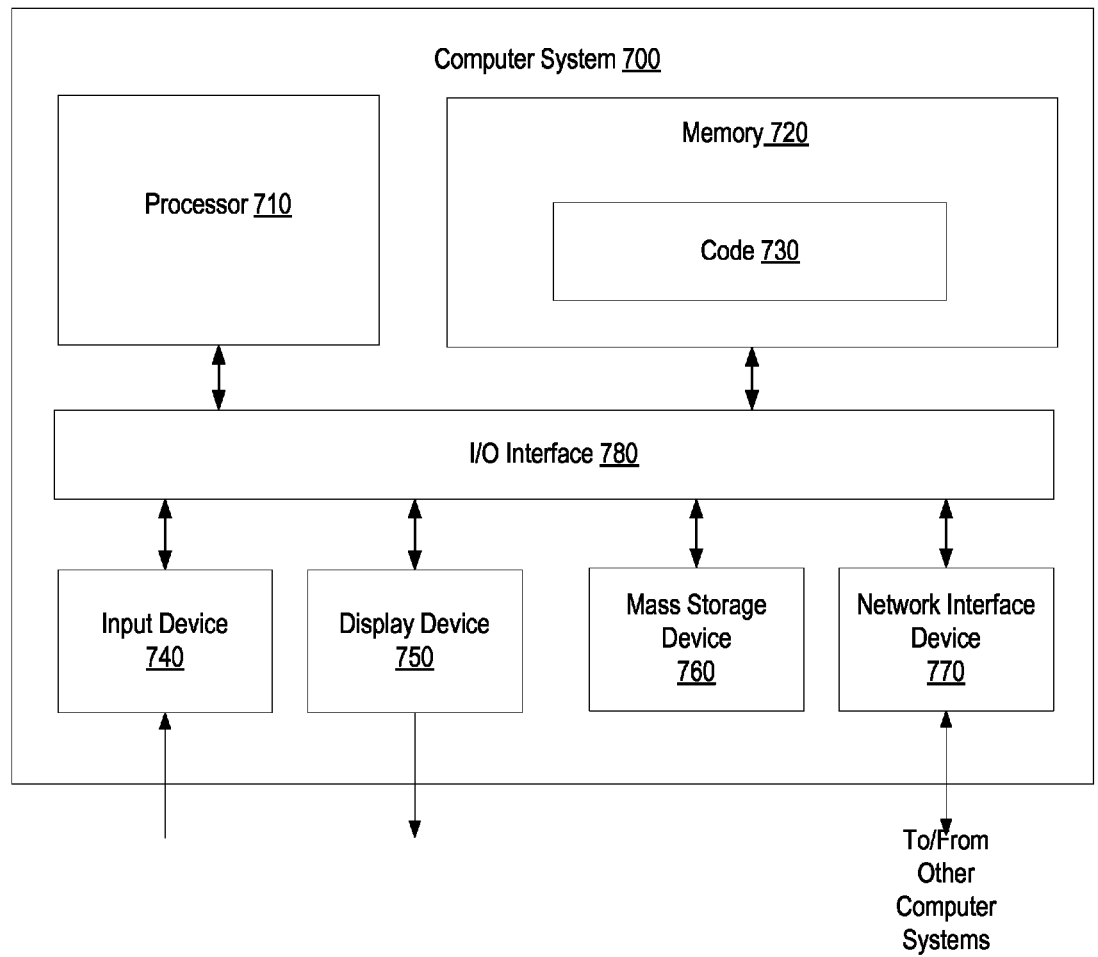
FIG. 7 is a block diagram illustrating a system for implementing a method for dynamically changing web URLs, according to some embodiments.

FIG. 7 is a block diagram illustrating a computing device, according to an embodiment. Various components of embodiments of the web browsers, web servers, data stores, clients and nodes, etc., as described herein, may be executed on one or more computer systems, which may interact with various other devices. One such computer system is illustrated by FIG. 7. In the illustrated embodiment, computer system 700 includes one or more processors 710 coupled to a system memory 720. Computer system 700 further includes a network interface 770 and one or more input/output devices 740/750, such as a cursor control device, keyboard, audio device and display device 750. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC™, Scalable Processor Architecture (SPARC™), or Million Instructions per Second (MIPS™) Instruction Set Architectures (ISAs), or any other suitable ISA. In multiprocessor systems, each of processors 710 may commonly, but not necessarily, implement the same ISA.

System memory 720 is one example of a computer accessible medium that may be configured to store program instructions 730 and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. Program instructions and/or data may also be stored, for example, on a hard disk. In the illustrated embodiment, program instructions and data implementing desired functions, such as those described above for web browser 120 and web server 110, as well as any of the methods shown in FIGS. 1-7, are shown stored within system memory 720 as program instructions 730 and data storage 760, respectively. In other embodiments, program instructions and/or data may be stored upon different types of computer-accessible media or on similar media separate from system memory 720 or computer system 700. Generally speaking, a computer-accessible medium may include storage media or memory media such as magnetic or optical media, e.g., disk or DVD/CD-ROM, volatile or non-volatile media such as RAM (e.g. Synchronous Dynamic RAM (SDRAM), Double Data Rate RAM (DDR RAM), RAMBUS Dynamic RAM (RDRAM), Static RAM (SRAM), etc.), Read Only Memory (ROM). Program instructions and data stored via a computer-accessible medium may be transmitted by transmission media or signals such as electrical, electromagnetic, or digital signals, which may be provided via a communication medium such as a network and/or a wireless link, such as may be implemented via network interface 770.

In one embodiment, I/O interface 780 may be configured to coordinate I/O traffic between processor 710, system memory 720, and any peripheral devices in the device, including network interface 770 or other peripheral interfaces. In some embodiments, I/O interface 780 may perform any necessary protocol, timing or other data transformations to convert data signals from one component (e.g., system memory 720) into a format suitable for use by another component (e.g., processor 710). In some embodiments, I/O interface 780 may include support for devices attached through various types of peripheral buses, such as a variant of Peripheral Component Interconnect (PCI) bus standard or the Universal Serial Bus (USB) standard, for example. In some embodiments, the function of I/O interface 780 may be split into two or more separate components, such as a north bridge and a south bridge, for example. Also, in some embodiments some or all of the functionality of I/O interface 780, such as an interface to system memory 720, may be incorporated directly into processor 710.

Network interface 770 may be configured to allow data to be exchanged between computer system 700 and other devices attached to a network, such as other computer systems, or between nodes of computer system 700. In various embodiments, network interface 770 may support communication via wired or wireless general data networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network and/or protocol.

Input/output devices 740 and 750 respectively, may in some embodiments include one or more display terminals, keyboards, keypads, touchpads, scanning devices, voice or optical recognition devices, or any other devices suitable for entering or retrieving data by one or more computer system 700. Multiple input/output devices 740 and 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 770.

Memory 720 may include program instructions 730, configured to implement at least a portion of embodiments of the web browser 120 and web server 110 as described herein, and data storage 760, comprising various documents, tables, databases, etc. accessible by program instructions 730. In one embodiment, program instructions 730 may include software elements of the web browser 120 and web server 110 illustrated in the Figures, and data storage 760 may include data used in embodiments of the web browser 120 and web server 110. In other embodiments, different software elements and data may be included. Program instructions and/or data may be stored, for example, on various types of memory including hard disks.

Those skilled in the art will appreciate that computer system 700 is merely illustrative and is not intended to limit the scope of the system as described herein. In particular, the computer system and devices may include any combination of hardware or software that can perform the indicated functions, including computers, network devices, internet appliances, PDAs, mobile phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, provided via a communication medium such as a network and/or a wireless link. Various embodiments may further include receiving, sending or storing instructions and/or data implemented in accordance with the foregoing description. Accordingly, the present system may be practiced with other computer system configurations.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc. Additionally, it is intended that any inconsistency in description between this document and any document incorporated within this document be resolved in favor of this document.

Various modifications and changes may be made as would be obvious to a person skilled in the art having the benefit of this disclosure. It is intended that the system embrace all such modifications and changes and, accordingly, the above description to be regarded in an illustrative rather than a restrictive sense.

What is claimed is:

1. A non-transitory computer-accessible storage medium storing program instructions, wherein the program instructions are computer-executable to implement a web browser configured to:

receive a document from a server, wherein the document comprises one or more original embedded Uniform Resource Locator (URL) references;

in response to user input from a given user, change a given one of the one or more original embedded URL references in the document to a corresponding given replacement embedded URL reference;

display the document with the given replacement embedded URL reference;

store a record of an association of the given original embedded URL reference to the corresponding given replacement embedded URL reference; and subsequent to receipt of the document and storage of the record of the association, receive the document again and automatically replace the given original embedded URL reference with the corresponding given replacement embedded URL reference, wherein the web browser performs the automatic replacement.

2. The non-transitory computer-accessible storage medium of claim 1, wherein the web browser is further configured to submit a request to the server to change the given original embedded URL reference to the corresponding given replacement embedded URL reference within the server's copy of the document.

3. The non-transitory computer-accessible storage medium of claim 1, wherein the given user is a member of an online community comprising a plurality of users, wherein each of the plurality of users is associated with a respective client-side application, and wherein the web browser is further configured to notify the online community of the given replacement embedded URL reference.

4. The non-transitory computer-accessible storage medium of claim 3, wherein to notify the online community of the given replacement embedded URL reference, the web browser is further configured to convey an indication of the given replacement embedded URL reference to respective web browsers associated with one or more other users who are members of the online community in a distributed, peer-to-peer fashion.

5. The non-transitory computer-accessible storage medium of claim 3, wherein to notify the online community of the given replacement embedded URL reference, the web browser is further configured to convey an indication of the given replacement embedded URL reference to a community server, wherein the community server is configured to maintain information on the state of the online community.

6. The non-transitory computer-accessible storage medium of claim 3, wherein the web browser is further configured to:
receive, via the online community, a notification of a particular replacement embedded URL reference corresponding to a particular original embedded URL reference for a particular document; and
subsequent to receiving the notification of the particular replacement embedded URL reference, receive the particular document and automatically replace the particular original embedded URL reference with the particular replacement embedded URL reference.

7. The non-transitory computer-accessible storage medium of claim 6, wherein the web browser is further configured to receive the notification in response to requesting the particular document.

8. The non-transitory computer-accessible storage medium of claim 6, wherein the web browser is further configured to receive the notification dependent upon the given user's having previously subscribed to receive notifications associated with the online community.

9. The non-transitory computer-accessible storage medium of claim 3, wherein a particular replacement embedded URL reference for a particular document is associated with a particular one of a plurality of online communities, and wherein the web browser is further configured to automatically replace a particular original embedded URL reference with the particular replacement embedded URL reference dependent upon determining whether the given user is a member of the particular online community.

10. The non-transitory computer-accessible storage medium of claim 3, wherein a plurality of replacement embedded URL references for a particular original embedded URL reference of the document are respectively associated with a plurality of online communities, and wherein the web browser is further configured to automatically replace the particular original embedded URL reference with a selected one of the particular replacement embedded URL references, wherein the selected particular replacement embedded URL reference is determined dependent upon the given user's membership with respect to the plurality of online communities.

11. The non-transitory computer-accessible storage medium of claim 1, wherein the web browser is further configured to:
display one or more suggested replacement embedded URL references to the given user; and
change the given one of the one or more original embedded URL references in the document to the corresponding given replacement embedded URL reference in response to the given user selecting the given replacement embedded URL reference from among the one or more suggested replacement embedded URL references.

12. The non-transitory computer-accessible storage medium of claim 11, wherein the web browser is further configured to receive the one or more suggested replacement embedded URL references from the server.

13. The non-transitory computer-accessible storage medium of claim 11, wherein the web browser is further configured to receive the one or more suggested replacement embedded URL references from an online community of which the given user is a member.

14. The non-transitory computer-accessible storage medium of claim 1, wherein the web browser is further configured to:
subsequent to storing the record of the association, receive a different document including the given original embedded URL reference;
automatically replace the given original embedded URL reference with the corresponding given replacement embedded URL reference within the different document; and
display the different document with the given replacement embedded URL reference.

15. The non-transitory computer-accessible storage medium of claim 1, wherein to change the given original embedded URL references in the document to the corresponding given replacement embedded URL reference and to store the record of the association, the web browser is further configured to execute coded functionality embedded in the document received from the server.

16. The non-transitory computer-accessible storage medium of claim 15, wherein the coded functionality embedded in the document comprises scripting code.

17. The non-transitory computer-accessible storage medium of claim 1, wherein to change the given original embedded URL references in the document to the corresponding given replacement embedded URL reference and to store the record of the association, the web browser is further configured to execute coded functionality that is independent of the document received from the server.

18. The non-transitory computer-accessible storage medium of claim 17, wherein the coded functionality is natively provided by the web browser.

19. The non-transitory computer-accessible storage medium of claim 17, wherein the coded functionality is provided via a third party module configured to interoperate with the web browser.

20. The non-transitory computer-accessible storage medium of claim 19, wherein the third party module comprises a plugin.

21. The non-transitory computer-accessible storage medium of claim 1, wherein the web browser is further configured to store the record of the association of the given original embedded URL reference to the corresponding given replacement embedded URL reference within the web browser's environment.

22. The non-transitory computer-accessible storage medium of claim 1, wherein the web browser is further configured to store the record of the association of the given original embedded URL reference to the corresponding given replacement embedded URL reference externally to the web browser's environment.

23. A computer-implemented method, comprising:
receiving, at a browser, a document from a server, wherein the document comprises one or more original embedded Uniform Resource Locator (URL) references;
in response to user input from a given user, changing a given one of the one or more original embedded URL references in the document to a corresponding given replacement embedded URL reference at the browser;
displaying, at the browser, the document with the given replacement embedded URL reference;
storing a record of an association of the given original embedded URL reference to the corresponding given replacement embedded URL reference; and subsequent to receiving the document and storing the record of the association, receiving the document again and automatically replacing the given original embedded URL reference with the corresponding given replacement embedded URL reference at the browser, wherein the browser performs said automatically replacing.

24. The method of claim 23, further comprising submitting a request to the server to change the given original embedded URL reference to the corresponding given replacement embedded URL reference within the server's copy of the document.

25. The method of claim 23, wherein the given user is a member of an online community comprising a plurality of users, wherein each of the plurality of users is associated with a respective client-side application, and wherein the method further comprises notifying the online community of the given replacement embedded URL reference.

26. The method of claim 25, wherein notifying the online community of the given replacement embedded URL reference comprises conveying an indication of the given replacement embedded URL reference to respective web browsers associated with one or more other users who are members of the online community in a distributed, peer-to-peer fashion.

27. The method of claim 25, wherein notifying the online community of the given replacement embedded URL reference comprises conveying an indication of the given replacement embedded URL reference to a community server, wherein the community server is configured to maintain information on the state of the online community.

28. The method of claim 25, further comprising:
receiving, via the online community, a notification of a particular replacement embedded URL reference corresponding to a particular original embedded URL reference for a particular document; and
subsequent to receiving the notification of the particular replacement embedded URL reference, receiving the particular document and automatically replacing the particular original embedded URL reference with the particular replacement embedded URL reference.

29. The method of claim 28, wherein receiving the notification occurs in response to requesting the particular document.

30. The method of claim 28, wherein receiving the notification occurs dependent upon the given user's having previously subscribed to receive notifications associated with the online community.

31. The method of claim 25, wherein a particular replacement embedded URL reference for a particular document is associated with a particular one of a plurality of online communities, and wherein the method further comprises automatically replacing a particular original embedded URL reference with the particular replacement embedded URL reference dependent upon determining whether the given user is a member of the particular online community.

32. The method of claim 25, wherein a plurality of replacement embedded URL references for a particular original embedded URL reference of the document are respectively associated with a plurality of online communities, and wherein the method further comprises selecting one of the particular replacement embedded URL references dependent upon the given user's membership with respect to the plurality of online communities and automatically replacing the particular original embedded URL reference with the selected one of the particular replacement embedded URL references.

33. The method of claim 23, further comprising:
displaying one or more suggested replacement embedded URL references to the given user; and
changing the given one of the one or more original embedded URL references in the document to the corresponding given replacement embedded URL reference in response to the given user selecting the given replacement embedded URL reference from among the one or more suggested replacement embedded URL references.

34. The method of claim 33, further comprising receiving the one or more suggested replacement embedded URL references from the server.

35. The method of claim 33, further comprising receiving the one or more suggested replacement embedded URL references from an online community of which the given user is a member.

36. The method of claim 23, further comprising:
subsequent to storing the record of the association, receiving a different document including the given original embedded URL reference;
automatically replacing the given original embedded URL reference with the corresponding given replacement embedded URL reference within the different document; and
displaying the different document with the given replacement embedded URL reference.

37. The method of claim 23, wherein changing the given original embedded URL references in the document to the corresponding given replacement embedded URL reference and storing the record of the association each comprise executing coded functionality embedded in the document received from the server.

38. The method of claim 37, wherein the coded functionality embedded in the document comprises scripting code.

39. The method of claim 23, wherein changing the given original embedded URL references in the document to the corresponding given replacement embedded URL reference and storing the record of the association each comprise executing coded functionality that is independent of the document received from the server.

40. The method of claim 39, wherein the coded functionality is natively provided by a web browser.

41. The method of claim 39, wherein the coded functionality is provided via a third party module configured to interoperate with a web browser.

42. The method of claim 41, wherein the third party module comprises a plugin.

43. The method of claim 23, further comprising storing the record of the association of the given original embedded URL reference to the corresponding given replacement embedded URL reference within the web browser's environment.

44. The method of claim 23, further comprising storing the record of the association of the given original embedded URL reference to the corresponding given replacement embedded URL reference externally to the web browser's environment.

45. A system, comprising:
one or more processors;
a memory coupled to one or more processors, wherein the memory stores program instructions executable by the one or more processors to implement a web server configured to:
receive, from a web browser, a request for a document;
serve the document to the web browser;
subsequent to having served the document to the web browser, receive, from the web browser, a request to change a given one of one or more original embedded URL references in the served document to a corresponding given replacement embedded URL reference;

in response to determining the request is valid, change the given original embedded URL reference in the document at the web server to the corresponding given replacement embedded URL reference; and store, at the web server, the document with the replacement embedded URL reference so that when the document is served to the web browser again the document is served including the given replacement embedded URL reference.

46. The system of claim 45, wherein the web server is further configured to:

subsequent to receiving the request to change the given original embedded URL reference, receive a request for the document from a document requester; and in response to receiving the request from the document requester, send the document with the given replacement embedded URL reference to the document requester.

47. The system of claim 45, wherein to store the document with the replacement embedded URL reference, the web server is further configured to preserve a record of the original embedded URL reference.

48. The system of claim 47, wherein the request to change the original embedded URL reference is received on behalf of a member of an online community, and wherein the web server is further configured to:

subsequent to receiving the request to change the given original embedded URL reference, receive a request for the document from a document requester;

in response to receiving the request from the document requester, determine whether the document requester is a member of the online community; and in response to determining that the document requester is a member of the online community, send the document with the given replacement embedded URL reference to the document requester.

49. The system of claim 48, wherein the web server is further configured to:

in response to determining that the document requester is not a member of the online community, send the document with the given original embedded URL reference to the document requester.

50. The system of claim 45, wherein to determine whether the request is valid, the web server is further configured to determine whether a total number of received requests to change the given original embedded URL reference to the corresponding given replacement embedded URL reference satisfies a threshold value.

51. The system of claim 45, wherein to determine whether the request is valid, the web server is further configured to determine whether an authority of a user associated with the request satisfies a threshold value.

52. The system of claim 45, wherein the web server is further configured to determine whether the request is valid dependent upon the recency of the request.

53. A computer-implemented method, comprising:

receiving, from a web browser, a request for a document;

sending the document to the web browser;

subsequent to said sending the document to the web browser, receiving, from the web browser, a request to change a given one of one or more original embedded URL references in the served document to a corresponding given replacement embedded URL reference;

in response to determining the request is valid, changing the given original embedded URL reference in the document at a web server to the corresponding given replacement embedded URL reference; and storing, at the web server, the document with the replacement embedded URL reference so that when the document is sent to the web browser again the document includes the given replacement embedded URL reference.

54. The method of claim 53, further comprising:

subsequent to receiving the request to change the given original embedded URL reference, receiving a request for the document from a document requester; and in response to receiving the request from the document requester, sending the document with the given replacement embedded URL reference to the document requester.

55. The method of claim 53, storing the document with the replacement embedded URL reference further comprises preserving a record of the original embedded URL reference.

56. The method of claim 55, wherein the request to change the original embedded URL reference is received on behalf of a member of an online community, and wherein the method further comprises:

subsequent to receiving the request to change the given original embedded URL reference, receiving a request for the document from a document requester;

in response to receiving the request from the document requester, determining whether the document requester is a member of the online community; and in response to determining that the document requester is a member of the online community, sending the document with the given replacement embedded URL reference to the document requester.

57. The method of claim 56, further comprising:

in response to determining that the document requester is not a member of the online community, sending the document with the given original embedded URL reference to the document requester.

58. The method of claim 53, wherein determining whether the request is valid further comprises determining whether a total number of received requests to change the given original embedded URL reference to the corresponding given replacement embedded URL reference satisfies a threshold value.

59. The method of claim 53, wherein determining whether the request is valid further comprises determining whether an authority of a user associated with the request satisfies a threshold value.

60. The method of claim 53, wherein determining whether the request is valid occurs dependent upon the recency of the request.

* * * * *